United States Patent
Hayes, Sr.

(10) Patent No.: US 7,381,058 B1
(45) Date of Patent: Jun. 3, 2008

(54) RELAY RACE BLOCKING SYSTEM

(76) Inventor: Johnnie D. Hayes, Sr., 7506 Carver Ave., Texas City, TX (US) 77591

(*) Notice: Subject to any disclaimer, the term of this patent is extended or adjusted under 35 U.S.C. 154(b) by 88 days.

(21) Appl. No.: 11/371,589

(22) Filed: Mar. 10, 2006

(51) Int. Cl.
*G09B 19/00* (2006.01)

(52) U.S. Cl. .................................................. 434/255

(58) Field of Classification Search ............ 434/247, 434/250, 255; 482/14, 19, 51
See application file for complete search history.

(56) References Cited

U.S. PATENT DOCUMENTS

| | | | | |
|---|---|---|---|---|
| 1,815,443 | A | * | 7/1931 | Mitchell ............. 434/250 |
| 3,340,621 | A | * | 9/1967 | Snyder .............. 434/255 |
| 3,747,233 | A | * | 7/1973 | Berryman .......... 434/255 |
| 3,985,359 | A |   | 10/1976 | Moore |
| 4,176,471 | A | * | 12/1979 | Roe ................... 434/255 |
| 4,228,599 | A | * | 10/1980 | Webster ............ 434/255 |
| D265,105 | S | * | 6/1982 | Arballo ............. D21/385 |
| 4,429,872 | A |   | 2/1984 | Capachi |
| 4,880,243 | A |   | 11/1989 | Raub |
| 5,248,152 | A | * | 9/1993 | Timmerman ........ 273/444 |
| 5,280,921 | A |   | 1/1994 | Milburn |
| D359,699 | S |   | 6/1995 | Vandergriff et al. |
| 5,427,383 | A |   | 6/1995 | Viens |
| 6,010,416 | A |   | 1/2000 | Frederick |
| 6,908,415 | B2 | * | 6/2005 | Branson ............ 482/51 |

OTHER PUBLICATIONS

"Track and Field Coahcing Program", pp. 240-249, 1995 [retrieved online Aug. 1, 2007].*

* cited by examiner

*Primary Examiner*—Kurt Fernstrom

(57) ABSTRACT

A relay race blocking system for alerting an outgoing runner when to start running to receive a baton from an incoming runner includes a waiting plate being positionable on a running track a predetermined distance from an exchange zone marked on the running track. A starting plate is positionable on the running track a distance from the waiting plate opposite the exchange zone. The starting plate indicates an area to alert the outgoing runner to begin to run toward the exchange zone when the incoming runner crosses into the area indicated by said starting plate.

8 Claims, 3 Drawing Sheets

RELAY RACE BLOCKING SYSTEM

BACKGROUND OF THE INVENTION

1. Field of the Invention

The present invention relates to athletic field markers and more particularly pertains to a new athletic field marker for alerting an outgoing runner when to start running to receive a baton from an incoming runner.

2. Description of the Prior Art

The use of athletic field markers is known in the prior art. U.S. Pat. No. 4,429,872 describes a device for being positioned in an athletic field to provide indicative markings that are not easily moved. Another type of athletic field marker is U.S. Pat. No. 5,280,921 for indication the location of yard marking to be marked on an athletic field. Another type of athletic field marker is U.S. Pat. No. 5,427,383 for facilitating the marking boundaries of a playing field.

While these devices fulfill their respective, particular objectives and requirements, the need remains for a system that has certain improved features that allows an outgoing runner to temporarily indicate an area, specific to the outgoing runner, on a running track when the outgoing runner needs to start running for an exchange zone upon an incoming runner crossing that area to facilitate a proper exchange of a baton in the exchange zone.

SUMMARY OF THE INVENTION

The present invention meets the needs presented above by generally comprising a waiting plate being positionable on a running track a predetermined distance from an exchange zone marked on the running track. A starting plate is positionable on the running track a distance from the waiting plate opposite the exchange zone. The starting plate indicates an area to alert the outgoing runner to begin to run toward the exchange zone when the incoming runner crosses into the area indicated by said starting plate.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
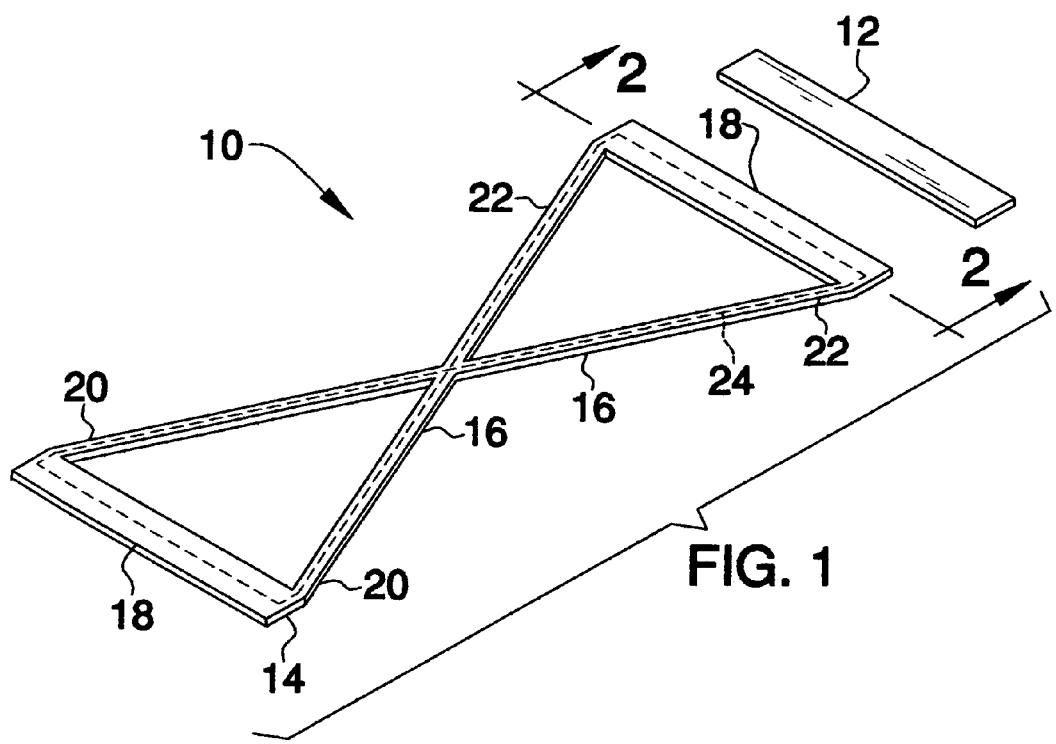
FIG. 1 is a perspective view of a relay race blocking system according to the present invention.
Figure 2:
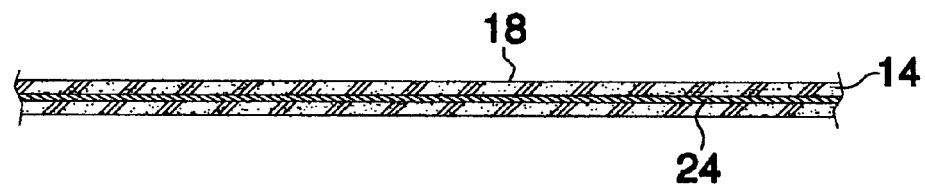
FIG. 2 is a cross-sectional view of the present invention taken along line 2-2 of FIG. 1.
Figure 3:
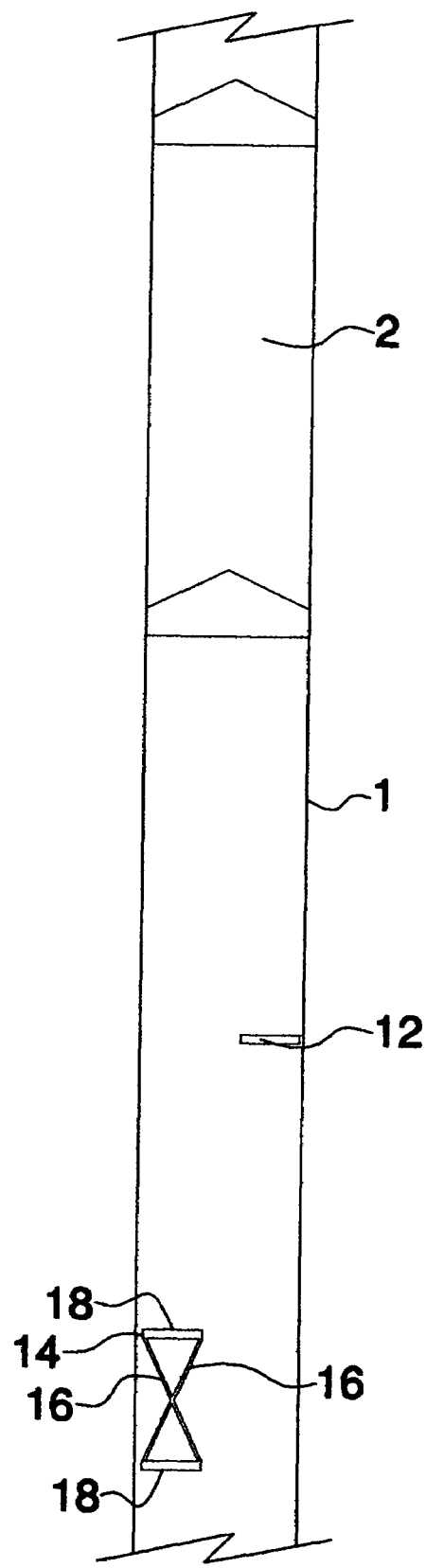
FIG. 3 is a top view of the present invention shown positioned on a running track.

With reference now to the drawings, and in particular to FIGS. 1 through 4 thereof, a new athletic field marker embodying the principles and concepts of the present invention and generally designated by the reference numeral 10 will be described.

As best illustrated in FIGS. 1 through 4, the relay race blocking system 10 generally comprises a waiting plate 12 being positionable on a running track 1 a predetermined distance from an exchange zone 2 marked on the running track 1. The waiting plate 12 comprises a substantially rectangular shape. The waiting plate 12 has a length of about 20 inches and a width of about 3 inches.

A starting plate 14 is positionable on the running track 1 a distance from the waiting plate 12 opposite the exchange zone 2. The starting plate 14 indicates an area to alert the outgoing runner to begin to run toward the exchange zone 2 when the incoming runner crosses into the area indicated by the starting plate 14. The starting plate 14 has a length of about 48 inches and a width of about 20 inches. The starting plate 14 comprises a resiliently compressible and flexible material to flex when impacted by the incoming runner.

The starting plate 14 includes a pair of arms 16. One of the arms 16 extends through the other one of the arms 16 to form an X-shape. A pair of terminal portions 18 is coupled to the arms 16 to inhibit twisting of the arms 16 with respect to one another and indicate a beginning and an end to the area indicated by the starting plate 14. The arms 16 are positioned between the terminal portions 18. One of the terminal portions 18 extends between a first end 20 of each of the arms 16 and the other one of the terminal portions 18 extends between a second end 22 of each of the arms 16. The terminal portions 18 are orientated substantially parallel to each other. A cord 24 extends through a center of each of the arms 16 and each of the terminal portions 18 to maintain position and inhibit twisting of the terminal portions 18 with respect to the arms 16. Each of the arms 16 has a width of about 1 inch and each of the terminal portions 18 has a length of about 20 inches and width of about 3 inches.

Figure 4:
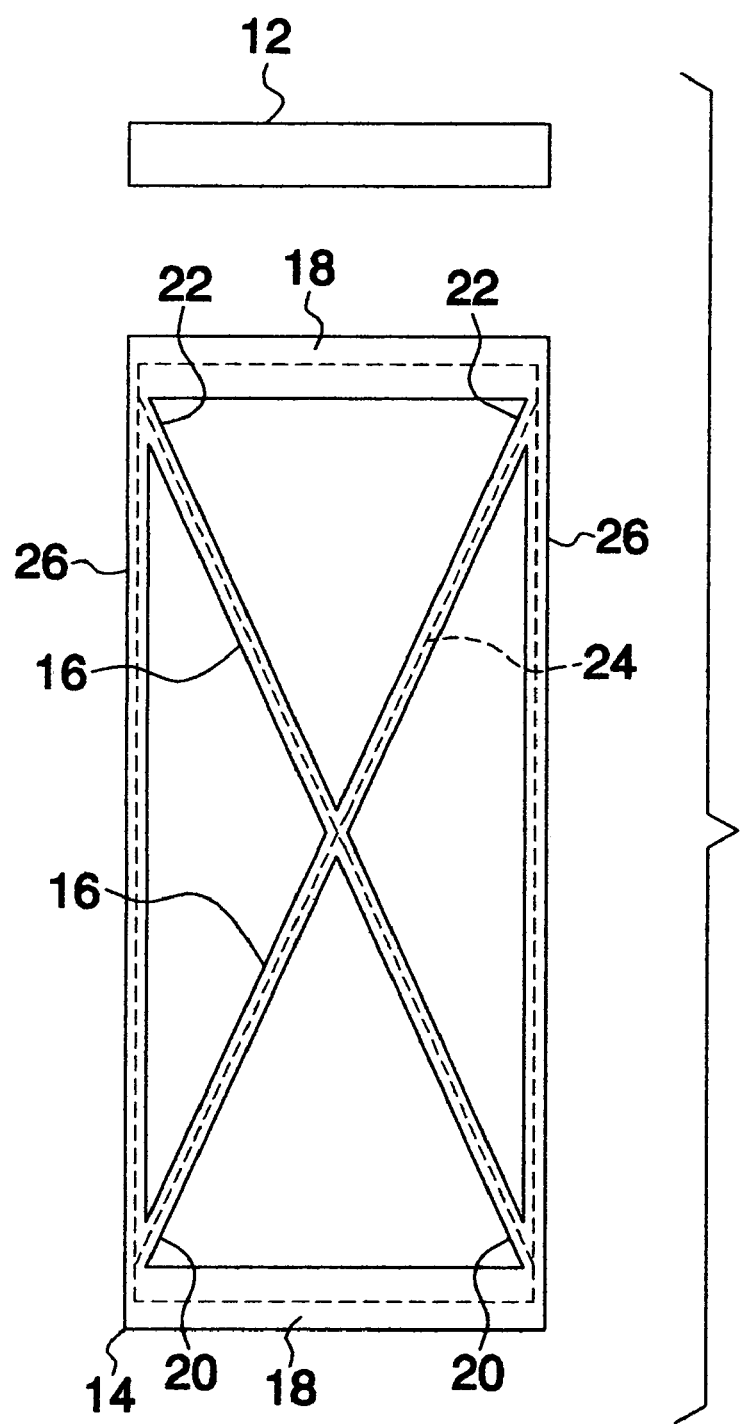
FIG. 4 is a top view of an embodiment of the present invention.

In an embodiment, as shown in FIG. 4, the starting plate 14 includes a pair of side portions 26. Each of the side portions 26 extends between the first end 20 of one of the arms 16 and the second end 22 of the other one of the arms 16. The combination of the side portions 26 with the terminal portions 18 gives the starting plate 14 a more box like appearance.

In use, the outgoing runner places the waiting plate 12 a distance from the exchange zone 2 that the outgoing runner can easily make the exchange zone 2 to make the exchange with incoming runner. The starting plate 14 is then positioned a distance up the running track 1 from the waiting plate 12 away from the exchange zone 2. When the incoming runner crosses the starting plate 14 the outgoing runner starts to run for the exchange zone 2 to allow for a proper handoff between the incoming runner and the outgoing runner in the exchange zone 2 during a relay race.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A relay race blocking system for alerting an outgoing runner when to start running to receive a baton from an incoming runner, the system comprising:
    a running track;
    a waiting plate being positioned on a said running track a predetermined distance from an exchange zone marked on the running track; and
    a starting plate being positioned on the running track a distance from said waiting plate opposite the exchange zone, said starting plate indicating an area to alert the outgoing runner to begin to run toward the exchange zone when the incoming runner crosses into the area indicated by said starting plate.

2. The system according to claim 1, wherein said waiting plate comprises a substantially rectangular shape.

3. The system according to claim 1, wherein said starting plate comprises a resiliently compressible material.

4. The system according to claim 1, wherein said starting plate includes a pair of arms, one of said arms extending through the other one of said arms to form an X-shape.

5. The system according to claim 4, wherein said starting plate includes a pair of terminal portions being coupled to said arms to inhibit twisting of said arms with respect to one another and indicating a beginning and an end to the area indicated by said starting plate, said arms being positioned between said terminal portions.

6. The system according to claim 5, wherein one of said terminal portions extends between a first end of each of said arms and the other one of said terminal portions extends between a second end of each of said arms, said terminal portions being orientated substantially parallel to each other.

7. The system according to claim 5, wherein said starting plate includes a cord extending through a center of each of said arms and each of said terminal portions to maintain position and inhibit twisting of said terminal portions with respect to said arms.

8. A relay race blocking system for alerting an outgoing runner when to start running to receive a baton from an incoming runner, the system comprising:
    a running track;
    a waiting plate being on said running track a predetermined distance from an exchange zone marked on the running track, said waiting plate comprising a substantially rectangular shape;
    a starting plate being positioned on the running track a distance from said waiting plate opposite the exchange zone, said starting plate alerting the outgoing runner to begin to run toward the exchange zone when the incoming runner crosses into the area indicated by said starting plate, said starting plate comprising a resiliently compressible material, said starting plate including:
        a pair of arms, one of said arms extending through the other one of said arms to form an X-shape;
        a pair of terminal portions being coupled to said arms to inhibit twisting of said arms with respect to one another and indicating a beginning and an end to the area indicated by said starting plate, said arms being positioned between said terminal portions, one of said terminal portions extending between a first end of each of said arms and the other one of said terminal portions extending between a second end of each of said arms, said terminal portions being orientated substantially parallel to each other; and
        a cord extending through a center of each of said arms and each of said terminal portions to maintain position and inhibit twisting of said terminal portions with respect to said arms.

* * * * *